United States Patent
Heeks et al.

(10) Patent No.: US 6,297,302 B1
(45) Date of Patent: Oct. 2, 2001

(54) STABILIZED FLUOROSILICONE MATERIALS

(75) Inventors: George J. Heeks, Rochester; David J. Gervasi, West Henrietta; Arnold W. Henry; Santokh S. Badesha, both of Pittsford, all of NY (US)

(73) Assignee: Xerox Corporation, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/375,592

(22) Filed: Aug. 17, 1999

(51) Int. Cl.[7] .............................. C08K 5/16; C08K 5/205
(52) U.S. Cl. ..................... 524/262; 524/264; 524/403; 524/407; 524/413; 524/435; 428/421; 399/308
(58) Field of Search ................................ 524/264, 403, 524/407, 413, 438, 262, 435; 399/325, 308; 428/421, 447

(56) References Cited

U.S. PATENT DOCUMENTS

| | | | |
|---|---|---|---|
| 3,002,927 | 10/1961 | Awe et al. | 508/201 |
| 3,893,761 | 7/1975 | Buchan et al. | 399/308 |
| 4,150,181 | 4/1979 | Smith | 427/444 |
| 4,711,818 | 12/1987 | Henry | 428/421 |
| 5,208,638 | 5/1993 | Bujese et al. | 399/310 |
| 5,303,014 | 4/1994 | Yu et al. | 399/314 |
| 5,340,866 * | 8/1994 | Evans | 524/403 |
| 5,395,725 | 3/1995 | Bluett et al. | 430/124 |
| 5,459,008 | 10/1995 | Chambers et al. | 430/126 |
| 5,464,703 | 11/1995 | Ferrar et al. | 428/421 |
| 5,493,376 | 2/1996 | Heeks et al. | 399/324 |
| 5,563,202 | 10/1996 | Ferrar et al. | 524/430 |
| 5,576,818 | 11/1996 | Badesha et al. | 399/308 |
| 5,585,905 | 12/1996 | Mammino et al. | 399/308 |
| 5,612,773 | 3/1997 | Berkes et al. | 399/307 |
| 5,849,399 * | 12/1998 | Law et al. | 428/212 |
| 5,864,740 | 1/1999 | Heeks et al. | 399/325 |
| 5,916,937 * | 6/1999 | Evans | 524/403 |
| 6,037,092 * | 3/2000 | Heeks et al. | 430/124 |
| 6,045,961 * | 4/2000 | Heeks et al. | 430/124 |

* cited by examiner

Primary Examiner—Daniel S Metzmaier
(74) Attorney, Agent, or Firm—Judith L. Byorick

(57) ABSTRACT

Disclosed is a composition comprising a crosslinked product of a liquid composition which comprises (a) a fluorosilicone, (b) a crosslinking agent and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound. The crosslinked fluorosilicones can be employed as intermediate or outer layers of electrostatographic fuser members, electrostatographic intermediate transfer belt materials and the like. They are useful in applications wherein materials possessing desirable release characteristics, surface energies, electrical characteristics, oil resistance properties, or solvent resistance properties exhibited by fluorosilicone elastomers are desirable. They are also useful in applications wherein fluorosilicones are exposed to high temperatures, since the stabilizing components reduce the generation of toxic effluents such as trifluoropropionaldehyde and formaldehyde, which can form when methyl-methyl crosslinking of the polymer occurs, and increase temperature stability.

20 Claims, No Drawings

STABILIZED FLUOROSILICONE MATERIALS

BACKGROUND OF THE INVENTION

The present invention is directed to crosslinked fluorosilicone materials. More specifically, the present invention is directed to thermally stabilized crosslinked fluorosilicone materials suitable for applications such as fuser member coatings for imaging processes and the like. One embodiment of the present invention is directed to a composition comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and pigment particles, or toner. The visible toner image is then in a loose powdered form and can be easily disturbed or destroyed. The toner image is usually fixed or fused upon a support, which can be the photosensitive member itself, or some other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner to be bonded firmly to the support.

Typically, the thermoplastic resin particles are fused to the substrate by heating to a temperature of from about 90° C. to about 200° C. or higher, depending on the softening range of the particular resin used in the toner. It may be undesirable, however, to increase the temperature of the substrate substantially higher than about 250° C. because of the tendency of the substrate to discolor or convert into fire at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll a belt member in pressure contact with a heater, and the like. Heat can be applied by heating one or both of the rolls, plate members, or belt members. Fusing of the toner particles occurs when the proper combination of heat, pressure, and/or contact for the optimum time period are provided. The balancing of these variables to bring about the fusing of the toner particles is well known in the art, and can be adjusted to suit particular machines or process conditions.

During the operation of one fusing system in which heat is applied to cause thermal fusing of the toner particles onto a support, both the toner image and the support are passed through a nip formed between a pair of rolls, plates, belts, or combination thereof. The concurrent transfer of heat and the application of pressure in the nip effects the fusing of the toner image onto the support. It is important in the fusing process that minimal or no offset of the toner particles from the support to the fuser member takes place during normal operations. Toner particles offset onto the fuser member can subsequently transfer to other parts of the machine or onto the support in subsequent copying cycles, thereby increasing the image background, causing inadequate copy quality, causing inferior marks on the copy, or otherwise interfering with the material being copied there as well as causing toner contamination of other parts of the machine. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release properties of the fuser member, and accordingly it is desirable to provide a fusing surface having a low surface energy to provide the necessary release.

To ensure and maintain good release properties of the fuser member, it has become customary to apply release agents to the fuser member during the fusing operation. Typically, these materials are applied as thin films of, for example, silicone oils, such as polydimethyl siloxane, or substituted silicone oils, such as amino-substituted oils, mercapto-substituted oils, or the like, to prevent toner offset. In addition, fillers can be added to the outer layers of fuser members to increase the bonding of the fuser oil to the surface of the fuser member, thereby imparting improved release properties.

The use of polymeric release agents having functional groups which interact with a fuser member to form a thermally stable, renewable self-cleaning layer having good release properties for electroscopic thermoplastic resin toners, is described in, for example, U.S. Pat. Nos. 4,029,827, 4,101,686, and 4,185,140, the disclosures of each of which are totally incorporated herein by reference. Disclosed in U.S. Pat. No. 4,029,827 is the use of polyorganosiloxanes having mercapto functionality as release agents. U.S. Pat. Nos. 4,101,686 and 4,185,140 are directed to polymeric release agents having functional groups such as carboxy, hydroxy, epoxy, amino, isocyanate, thioether, and mercapto groups as release fluids.

It is important to select the correct combination of fuser surface material, any filler incorporated or contained therein, and fuser oil. Specifically, it is important that the outer layer of the fuser member react sufficiently with the selected fuser oil to obtain sufficient release. To improve the bonding of fuser oils with the outer surface of the fuser member, fillers have been incorporated into or added to the outer surface layer of the fuser members. The use of a filler can aid in decreasing the amount of fusing oil necessary by promoting sufficient bonding of the fuser oil to the outer surface layer of the fusing member. It is important, however, that the filler not degrade the physical properties of the outer layer of the fuser member, and it is also important that the filler not cause too much of an increase in the surface energy of the outer layer.

Fillers are also sometimes added to the outer layers of fuser members to increase the thermal conductivity thereof. Examples of such fillers include conductive carbon, carbon black, graphite, aluminum oxide, titanium, and the like, as well as mixtures thereof. Efforts have been made to decrease the use of energy by providing a fuser member which has excellent thermal conductivity, thereby reducing the temperature needed to promote fusion of toner to paper. This increase in thermal conductivity also allows for increased speed of the fusing process by reducing the amount of time needed to heat the fuser member sufficiently to promote fusing. Efforts have also been made to increase the toughness of the fuser member layers to increase abrasion resistance and, accordingly, the life of the fuser member.

With regard to known fuser coatings, silicone rubber has been the preferred outer layer for fuser members in electrostatographic machines. Silicone rubbers interact well with various types of fuser release agents. Perfluoroalkoxypolytetrafluoroethylene (PFA Teflon), however, which is frequently used as an outer coating for fuser members, is more durable and abrasion resistant than silicone rubber coatings. Also, the surface energy for PFA Teflon is lower than that of silicone rubber coatings.

It can be advantageous to transfer the developed image to a transfer member, and subsequently to transfer the developed image from the transfer member to a permanent substrate with very high transfer efficiency. The toner image is subsequently usually fixed or fused upon a support, which can be the photosensitive member itself, or can be any other desired support sheet, such as plain paper.

Transfer members allow for positive attributes such as high throughput at modest process speeds, improved registration of the final color toner image in color systems using synchronous development of one or more component colors using one or more transfer stations, and increased range of final substrates that can be used.

In electrostatographic printing machines wherein the toner image is transferred from the transfer member to the image receiving substrate, the transfer of the toner particles from the transfer member to the image receiving substrate preferably is as complete as possible. Less than complete transfer to the image receiving substrate can result in image degradation and low resolution. Efficient transfer is particularly important when the imaging process entails generating full color images, since undesirable color deterioration in the final colors can occur when the color images are not completely transferred from the transfer member.

Accordingly, the transfer member surface preferably has excellent release characteristics with respect to the toner particles. Conventional materials known in the art for use as transfer members often possess the strength, conformability, and electrical conductivity necessary for use as transfer members, but can suffer from poor toner release characteristics, especially with respect to higher gloss image receiving substrates.

Although use of a release agent increases toner transfer, the transfer member outer layer can swell upon addition of the release agent. For example, silicone rubber performs well as a transfer layer, but swells significantly in the presence of a hydrocarbon fluid release agent. In addition, release properties have been shown to decay from repeated interaction with certain release agents such as hydrocarbon release agents.

Preferably, the resistivity of the transfer member is within a preferred range to allow for sufficient transfer. The transfer member also preferably has a controlled resistivity, wherein the resistivity is virtually unaffected by changes in humidity, temperature, bias field, or operating time. In addition, a controlled resistivity is desirable so that a bias field can be established for electrostatic transfer. The transfer member preferably is not too conductive, since air breakdown can possibly occur in that instance.

Attempts at controlling the resistivity of transfer members have been performed by, for example, adding conductive fillers to the outer layer. Use of carbon black as a conductive filler has been disclosed. Carbon black has been the chosen additive for imparting conductive properties in electrostatographic films. Carbon black is relatively inexpensive and very efficient in that a relatively small percentage can impart a high degree of conductivity. Many doped metal oxides can also be employed to impart desired conductivity to the member.

U.S. Pat. No. 5,864,740 (Heeks et al.), the disclosure of which is totally incorporated herein by reference, discloses a thermally stabilized silicone liquid composition and a toner fusing system using the thermally stabilized silicone liquid as a release agent, wherein the thermally stabilized silicone liquid contains a silicone liquid and a thermal stabilizer composition (including a reaction product from at least a polyorganosiloxane and a platinum metal compound (Group VIII compound) such as a ruthenium compound, excluding platinum.

U.S. Pat. No. 5,493,376 (Heeks), the disclosure of which is totally incorporated herein by reference, discloses a thermally stabilized polyorganosiloxane oil including a polyorganosiloxane oil and, as the thermal stabilizer, the reaction product of chloroplatinic acid and a member selected from the group consisting of a cyclic polyorganosiloxane having the formula

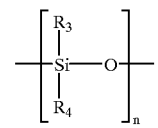

where $R_3$ is an alkyl radical having 1 to 6 carbon atoms and $R_4$ is selected from the group consisting of alkene and alkyne radicals having 2 to 8 carbon atoms, and n is from 3 to 6; a linear polyorganosiloxane having the formula

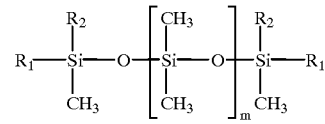

wherein $R_1$ and $R_2$ are selected from the group consisting of hydroxy and alkyl, alkoxy, alkene, and alkyne radicals having 1 to 10 carbon atoms, provided that at least one of $R_1$ and $R_2$ is alkene or alkyne, and m is from 0 to 50; and mixtures thereof, present in an amount to provide at least 5 parts per million of platinum in said oil.

U.S. Pat. No. 5,395,725 (Bluett et al.), the disclosure of which is totally incorporated herein by reference, discloses a process for fusing toner images to a substrate which comprises providing a fusing member having a fusing surface; heating the fuser member to an elevated temperature to fuse toner to the substrate; and applying directly to the fusing surface a fuser release agent oil blend composition; wherein volatile emissions arising from the fuser release agent oil blend are minimized or eliminated.

U.S. Pat. No. 4,150,181 (Smith), the disclosure of which is totally incorporated herein by reference, discloses a contact fuser assembly and method for preventing toner offset on a heated fuser member in an electrostatic reproducing apparatus which includes a base member coated with a solid, abrasion resistant material such as polyimide, poly(amide-imides), poly(imide-esters), polysulfones, and aromatic polyamides. The fuser member is coated with a thin layer of polysiloxane fluid containing low molecular weight fluorocarbon. Toner offset on the heated fuser member is prevented by applying the polysiloxane fluid containing fluorocarbon to the solid, abrasion resistant surface of the fuser member.

U.S. Pat. No. 3,002,927 (Awe et al.), the disclosure of which is totally incorporated herein by reference, discloses organosilicon fluids capable of withstanding high temperatures which are prepared by preoxygenating the fluid by heating a mixture of (1) a polysiloxane fluid in which the siloxane units are selected from the group consisting of units of the formula $R_3SiO_{0.5}'$, $R_2SiO$, $RSiO_{1.5}'$, and $SiO_2$ in which each R is selected from the group consisting of methyl, phenyl, chlorophenyl, fluorophenyl, and bromophenyl radicals, (2) a ferric salt of a carboxylic acid having from 4 to 18 carbon atoms in an amount such that there is from 0.005 to 0.03 percent by weight iron based on the weight of (1), and (3) oxygen mechanically dispersed in the fluid at a temperature above 400° F. until the mixture changes to a reddish brown color and until the mixture will not form a precipitate when heated in the absence of oxygen at a temperature above that at which the preoxygenation step is carried out.

U.S. Pat. No. 4,711,818 (Henry), the disclosure of which is totally incorporated herein by reference, discloses a thermally conductive dry release fuser member and fusing method for use in electrostatic reproducing machines without the application of a release agent. The fuser member comprises a base support member and a thin deformable layer of a composition coated thereon, the composition comprising the crosslinked product of a mixture of at least one addition curable vinyl terminated or vinyl pendant polyfluoroorganosiloxane, filler, heat stabilizer, a crosslinking agent, and a crosslinking catalyst.

U.S. Pat. No. 5,464,703 (Ferrar et al.) and U.S. Pat. No. 5,563,202 (Ferrar et al.), the disclosures of each of which are totally incorporated herein by reference, disclose a fuser member useful for heat fixing an electrographic toner to a substrate, a composition of matter, and its preparation method. The fuser member has a core and a base cushion layer overlying the core. The base cushion layer includes a crosslinked poly(dimethylsiloxane-fluoroalkylsiloxane) elastomer that has tin oxide particles dispersed therein in a concentration of from 20 to 40 percent of the total volume of the base cushion layer.

U.S. Pat. No. 5,585,905 (Mammino et al.), the disclosure of which is totally incorporated herein by reference, discloses an intermediate toner transfer member for use in an electrostatographic printing apparatus employing a liquid developer comprising: (a) a substrate; and (b) an outer layer comprising a fluoroelastomer polymerized from a plurality of monomers, at least one monomer being an olefin having only carbon atoms and hydrogen atoms, and at least one monomer being fluorinated.

U.S. Pat. No. 5,303,014 (Yu et al.), the disclosure of which is totally incorporated herein by reference, discloses a bias transfer member including a peripheral surface having low surface energy. The low surface energy provides improved cleanability for enhancing the electrostatographic process and increasing the life of the bias transfer member. A low surface energy layer is provided by plasma fluorination to modify chemically the makeup of the surface material or by coating to form a low surface energy layer on the bias transfer member.

U.S. Pat. No. 5,576,818 (Badesha et al.), the disclosure of which is totally incorporated herein by reference, discloses an intermediate toner transfer component including: (a) an electrically conductive substrate; (b) a conformable and electrically resistive layer comprising a first polymeric material; and (c) a toner release layer comprising a second polymeric material selected from the group consisting of a fluorosilicone and a substantially uniform integral interpenetrating network of a hybrid composition of a fluoroelastomer and a polyorganosiloxane, wherein the resistive layer is disposed between the substrate and the release layer.

U.S. Pat. No. 5,612,773 (Berkes et al.), the disclosure of which is totally incorporated herein by reference, discloses a transfusing member having a compression layer comprising a highly conformable, low durometer material with a low surface tension. The transfusing member forms a first transfer nip characterized by a first pressure with a photoreceptive surface and a second transfer nip characterized by a second pressure, which is of the same order of magnitude as the first pressure, with a backup roller.

U.S. Pat. No. 3,893,761 (Buchan et al.), the disclosure of which is totally incorporated herein by reference, discloses an apparatus for transferring non-fused xerographic toner images from a first support material, such as a photoconductive insulating surface, to a second support material, such as paper, and fusing the toner images to the second support material. Such apparatus includes an intermediate transfer member having a smooth surface of low surface free energy and a hardness of from 3 to 70 durometers. The intermediate transfer member can be, for example, a 0.1 to 10 mil layer of silicone rubber coated onto a polyimide support. The member can be formed into belt or drum configuration. Toner images are transferred from the first support material to the intermediate transfer member; this transfer can be by any conventional transfer method, but pressure transfer is preferred. Next, the toner image is heated on the intermediate transfer member to at least its melting point temperature. Preferably the heating is selective, and one means of selectively heating toner is to provide radiant heating means and a belt formed from a transparent silicone rubber on a reflecting intermediate member support. After the toner is heated, second support material is brought into pressure contact with hot toner whereby toner is transferred and fused to the second support material. In preferred embodiments, a pressure applying element is used to provide a pressure pulse which has a steep rise time at the point where the intermediate transfer member and second support material come into contact. A method of transferring and fusing toner images is also disclosed.

U.S. Pat. No. 5,208,638 (Bujese et al.), the disclosure of which is totally incorporated herein by reference, discloses an improved intermediate transfer surface employing a conductive fluoropolymer material and preferably a conductive material dispersed in c fluoroelastomer layer for use in electrostatic color image transfers. The intermediate fluoropolymer transfer surface is heat and solvent resistant and retains its electrical conductivity upon exposure to both heat and solvent, while exhibiting excellent thermal release characteristics for contact transfers of dried liquid color toners. A method of xeroprinting a color image onto a receiving substrate using a first electrostatic transfer through a liquid-filled gap to the conductive intermediate transfer surface and then a second contact transfer from the conductive intermediate fluoropolymer transfer surface to a final receiving surface is also disclosed.

U.S. Pat. No. 5,459,008 (Chambers et al.), the disclosure of which is totally incorporated herein by reference, discloses the complete toner transfer from the surface of an intermediate transfer member of an electrostatic printing machine to an image receiving substrate such as paper that can range in gloss from low to very high. This transfer is accomplished by the use of a thin film coating of a release agent material upon the surface of the intermediate transfer member or by the incorporation of a release agent material onto or into toner particles.

U.S. application Ser. No. 09/375,968, filed concurrently herewith, now U.S. Pat. No. 6,045,961 entitled "Thermally Stable Silicone Fluids," with the named inventors George J. Heeks, David J. Gervasi, Arnold W. Henry, and Santokh S. Badesha, the disclosure of which is totally incorporated herein by reference, discloses a fuser release agent comprising (a) a polyorganosiloxane, and (b) a stabilizing agent comprising the reaction product of (i) a metal acetylacetonate or metal oxalate compound, (ii) a linear unsaturated-alkyl-group-substituted polyorganosiloxane, and (iii) a cyclic unsaturated-alkyl-group-substituted polyorganosiloxane.

U.S. application Ser. No. 376,747, filed concurrently herewith, now U.S. Pat. No. 6,037,092 entitled "Stabilized Fluorosilicone Fuser Members," with the named inventors George J. Heeks, David J. Gervasi, Arnold W. Henry, and Santokh S. Badesha, the disclosure of which is totally incorporated herein by reference, discloses a fuser member comprising a substrate and at least one layer thereover, said layer comprising a crosslinked product of a liquid composition which comprises (a) a fluorosilicone, (b) a crosslinking agent and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

U.S. application Ser. No. 09/375,974, filed concurrently herewith, entitled "Stabilized Fluorosilicone Transfer Members," with the named inventors George J. Heeks, David J. Gervasi, Arnold W. Henry, and Santokh S. Badesha, the disclosure of which is totally incorporated herein by reference, discloses a transfer member comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound, said transfer member having surface a resistivity of from about $10^4$ to about $10^{16}$ ohms per square.

Silicone rubbers are widely used in fusing subsystems, largely because they can be modified to optimum fusing properties. Desirable physical properties in fusing materials include thermal conductivity, hardness, and toughness. One disadvantage of using silicone rubbers is that silicone rubbers swell in various solvents and in silicone oils. In current release agent technology, silicone oils are commonly used, but because of the swelling of silicone rubber in the oil, it is often necessary to coat the silicone fuser rolls with a fluoropolymer. Fluorosilicones that will resist swelling and possess the preferred physical properties for fusing are also available, but fluorosilicones are unstable at high temperatures (for example, over 300° F.), and they can release trifluoropropionaldehyde, an acute nerve toxin.

Accordingly, while known compositions and processes are suitable for their intended purposes, a need remains for improved silicone rubber materials. In addition, a need remains for fuser member layers exhibiting thermal conductivity, hardness, and toughness. Further, there is a need for fuser member silicone rubber layers exhibiting reduced swelling in solvents and silicone oils. Additionally, there is a need for fuser member fluorosilicone rubber layers that are stable at high temperatures. There is also a need for fluorosilicone materials that exhibit improved stability at high temperatures. In addition, there is a need for fluorosilicone materials that emit reduced amounts of trifluoropropionaldehyde at high temperatures. Further, there is a need for fluorosilicone fuser members with improved environmental, health, and safety characteristics. In addition, a need remains for transfer members exhibiting thermal conductivity, hardness, and toughness. Further, there is a need for transfer members of silicone rubbers exhibiting reduced swelling in solvents and silicone oils. Additionally, there is a need for transfer members of fluorosilicone rubbers that are stable at high temperatures. There is also a need for fluorosilicone transfer members with improved environmental, health, and safety characteristics. In addition, there is a need for transfer belt materials possessing release and solvent resistance properties exhibited by fluorosilicone elastomers. Further, there is a need for transfer belt materials that can be tailored for the desired electrical characteristics while maintaining a low surface energy.

SUMMARY OF THE INVENTION

The present invention is directed to a composition comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

DETAILED DESCRIPTION OF THE INVENTION

The composition of the present invention comprises a crosslinked fluorosilicone polymer. This composition is prepared by first preparing a liquid composition containing the uncrosslinked fluorosilicone polymer, a crosslinking agent, and a thermal stabilizer according to the present invention as disclosed hereinbelow, as well as any desired optional fillers or other optional components. The liquid composition can, if desired, be applied to a substrate, followed by crosslinking of the fluorosilicone polymer, typically by heating to a temperature of from about 200 to about 400° F., although the temperature can be outside of this range, and typically for from about 10 to about 30 minutes, although the time can be outside of this range, and although other crosslinking methods can also be employed.

Examples of suitable fluorosilicones (prior to crosslinking) for the composition of the present invention include, but are not limited to, those of the general formula

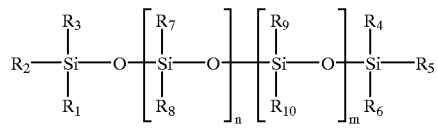

wherein each of $R_1$, $R_2$, $R_3$, $R_4$, $R_5$, $R_6$, $R_7$, $R_8$, $R_9$, and $R_{10}$, independently of the others, is an alkyl group, including linear, branched, cyclic, unsaturated, and substituted alkyl groups, typically with from 1 to about 18 carbon atoms, preferably with from 1 to about 8 carbon atoms, more preferably with from 1 to about 6 carbon atoms, and even more preferably with from 1 to about 3 carbon atoms, although the number of carbon atoms can be outside of these ranges, an aryl group, including substituted aryl groups, typically with from 6 to about 18 carbon atoms, preferably with from 6 to about 10 carbon atoms, and even more preferably with from 6 to about 8 carbon atoms, although the number of carbon atoms can be outside of this range, or an arylalkyl group (with either the alkyl or the aryl portion of the group being attached to the silicon atom), including substituted arylalkyl groups, typically with from 7 to about 18 carbon atoms, preferably with from 7 to about 12 carbon atoms, and more preferably with from 7 to about 9 carbon atoms, although the number of carbon atoms can be outside of these ranges, provided that at least one of $R_9$ and $R_{10}$ is a fluoro-substituted alkyl, aryl, or arylalkyl group. The average fluorine content of the polyorganosiloxane molecules in the uncrosslinked liquid typically is from about 5 to about 71 percent by weight, although the fluorine content can be outside of this range. Further, m and n are each integers representing the number of repeat monomer units; typically, m is from 0 to about 1,000 and n is from 1 to about 1,000, with the sum of m+n typically being from about 50 to about 5,000, preferably from about 50 to about 1,000, and more preferably from about 50 to about 200, although the number of repeat monomer units can be outside of this range. These polymers generally are random copolymers of substituted and unsubstituted siloxane repeat units, although alternating, graft, and block copolymers are also suitable. The fluorosilicones (prior to crosslinking) for the outer fusing layer of the fuser member are of any suitable or desired effective weight average molecular weight, typically from about 3,600 to about 80,000, preferably from about 6,000 to about 70,000, and more preferably from about 10,000 to about 30,000, although the weight average molecular weight can be outside of these ranges. Typical number average molecular weights are from about 5,000 to about 20,000, although the number average molecular weight can be outside of this range.

Specific examples of suitable materials of this formula include those of the formula

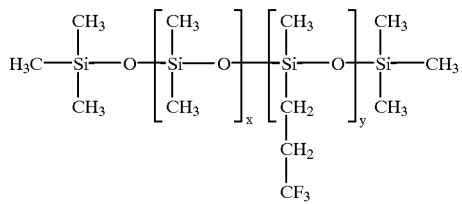

wherein x and y are integers representing the number of repeat monomer units, those of the above formula wherein at least two of the methyl groups are replaced with vinyl groups, as disclosed in, for example, U.S. Pat. No. 4,711,818, the disclosure of which is totally incorporated herein by reference, those of the general formula

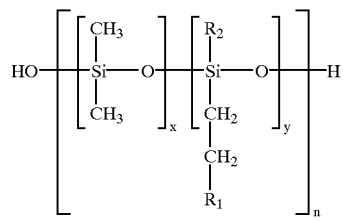

wherein $R_1$ is a fluoroalkyl group having from about 1 to 18 carbon atoms and from about 3 to 37 fluorine atoms, $R_2$ is an alkyl group having from 1 to 6 carbon atoms, the ratio of x:y is from about 99:1 to about 70:30, and n is an integer such that, before crosslinking, the polymer has a number average molecular weight of from about $1\times10^3$ to about $1\times10^6$, as disclosed in, for example, U.S. Pat. No. 5,464,703 and U.S. Pat. No. 5,563,202, the disclosures of each of which are totally incorporated herein by reference, other condensation polymers prepared by the condensation reaction of difunctional dialkylsiloxane monomers or oligomers and difunctional fluoroalkylsilane monomers or oligomers, and the like. Specific examples of suitable commercially available fluorosilicones include those available from United Chemical, Piscataway, N.J., the SILASTIC fluorosilicone materials available from Dow Corning Co., Midland, Mich., other fluorosilicones such as nonylfluorohexyl and fluorosiloxanes, including DC94003 and Q5-8601, both available from Dow Corning Co., Midland, Mich., the FSL fluorosilicone materials available from General Electric Corp., Schenectady, N.Y., the Shin-Etsu Fluorosilicone Elastomers, available from Shincor Silicones, Inc., Akron, Ohio, and the like.

Any desired or effective crosslinking agent can be employed. Examples of suitable crosslinking agents include, but are not limited to, hydrogen peroxide, organic peroxides commonly used as crosslinking agents, organic diamine curatives, such as hexamethylene diamine carbamate and N,N'-dicinnamylidene-1,6-hexanediamine (commercially available from E.I. DuPont de Nemours and Co. as Diak® No. 1 and Diak® No. 3, respectively), and the like. The crosslinking agent is present in the liquid composition comprising the fluorosilicone in any desired or effective amount, typically from about 1 to about 10 percent by weight of the fluorosilicone polymer, although the amount can be outside of this range.

The thermal stabilizing agent present in the outer layer of the fuser members of the present invention is a reaction product of a cyclic unsaturated-alkyl-group-substituted polyorganosiloxane, a linear unsaturated-alkyl-group-substituted polyorganosiloxane, and a metal-bidentate ligand compound. The bidentate ligand compound is a metal acetylacetonate compound, of the general formula

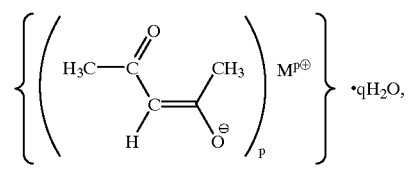

or a metal oxalate compound, of the general formula

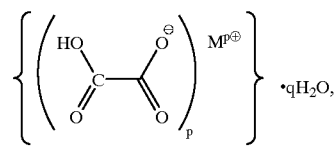

wherein M represents a divalent or trivalent metal ion, p is an integer representing the charge on the metal ion and is 2 or 3, and q is an integer representing the number of complexed hydrate groups in the compound, and typically ranges from 0 to about 20. Examples of suitable metal ions include (but are not limited to) $Zr^{2+}$, $Zn^{2+}$, $Fe^{2+}$, $Fe^{3+}$, $Ce^{3+}$, $Ce^{2+}$, $Cr^{3+}$, and the like. One particularly preferred metal-bidentate ligand compound is cerium (III) acetylacetonate hydrate, available from, for example, Aldrich Chemical Co., Milwaukee, Wis. The metal-bidentate ligand compound is present in the stabilizing agent in any suitable or effective amount, typically from about 9 to about 59 parts by weight for every 4 to 30 parts by weight of the cyclic unsaturated-alkyl-group-substituted polyorganosiloxane and for every 4 to 30 parts by weight of the linear unsaturated-alkyl-group-substituted polyorganosiloxane, preferably from about 25 to about 42 parts by weight for every 10 to 22 parts by weight of the cyclic unsaturated-alkyl-group-substituted polyorganosiloxane and every 10 to 22 parts by weight of the linear unsaturated-alkyl-group-substituted polyorganosiloxane, and more preferably about 34 parts by weight for every 17 parts by weight of the cyclic unsaturated-alkyl-group-substituted polyorganosiloxane and every 17 parts by weight of the linear unsaturated-alkyl-group-substituted polyorganosiloxane, although the relative amounts can be outside of these ranges. Expressed another way, the stabilizing agent typically is prepared by beginning with a base of 100 centistoke nonfunctional polydimethyl siloxane oil to facilitate mixing of the ingredients. The stabilizer components are then added to this base. For every 100 parts by weight of the nonfunctional polydimethylsiloxane, typically there are from about 9 to about 59 parts by weight of the metal-bidentate ligand compound, from about 4 to about 30 parts by weight of the cyclic unsaturated-alkyl-group-substituted polyorganosiloxane, and from about 4 to about 30 parts by weight of the linear unsaturated-alkyl-group-substituted polyorganosiloxane. Preferably, for every 100 parts by weight of the nonfunctional polydimethylsiloxane, typically there are from about 25 to about 42 parts by weight of the metal-bidentate ligand compound, from about 10 to about 22 parts by weight of the cyclic unsaturated-alkyl-group-substituted polyorganosiloxane, and from about 10 to about 22 parts by weight of the linear unsaturated-alkyl-group-substituted polyorganosiloxane. More preferably, for every 100 parts by weight of the nonfunctional polydimethylsiloxane, typically there are about 34 parts by weight of the metal-bidentate ligand compound, about 17 parts by weight of the cyclic unsaturated-alkyl-group-substituted polyorganosiloxane, and about 17 parts by weight of the linear unsaturated-alkyl-group-substituted polyorganosiloxane. Again, the relative amounts can be outside of these ranges.

The linear unsaturated-alkyl-group-substituted polyorganosiloxane typically is of the general formula

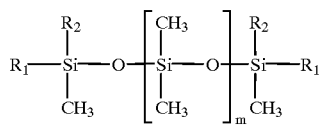

wherein $R_1$ and $R_2$ are selected from the group consisting of hydroxy and alkyl, alkoxy, alkene, and alkyne radicals having from 1 to about 10 carbon atoms, provided that at least one of $R_1$ and $R_2$ is alkene or alkyne, and m is an integer representing the number of repeat monomer units, typically being from 0 to about 350, preferably from about 50 to about 325, and more preferably from about 100 to about 300, although the value of m can be outside of this range. Specific examples of suitable linear unsaturated-alkyl-group-substituted polyorganosiloxones include materials such as $(CH_2=CH)(CH_3)_2SiOSi(CH_3)_2(CH=CH)$ (1,3-divinyl tetramethyl disilozane), $(CH_2=CHCH_2)_2(CH_3)SiOSi(CH_3)(CH_2CH=CH_2)_2$ (1,1,3,3-tetrally-1,3-dimethyl disilazane); $(CH_2=CH)(CH_3)(HO)SiOSi(OH)(CH_3)(CH=CH_2)$ (1,3-divinyl-1,3-dimethyl-1,3dihydroxy disiloxane), $(CH_2=CH)(CH_3)_2SiO(SiO(CH_3)_2)_nSi(CH_3)_2(CH=CH_2)$ (polydimethyl siloxane, vinyl dimethyl terminated, wherein n varies from 1 to about 50, all available from United Chemical Technologies, Piscataway, N.J., and the like, as well as mixtures thereof. One particularly preferred linear unsaturated-alkyl-group-substituted polyorganosiloxane is a vinyl dimethyl terminated polyorganosiloxane, such as those available from, for example, United Chemical Technologies, Piscataway, N.J., as PS496, believed to be of the general formula

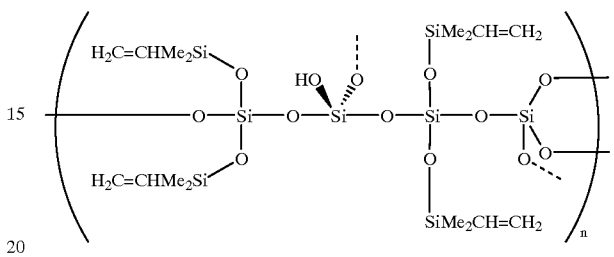

wherein n is an integer representing the number of repeat monomer units, and typically is from about 100 to about 325, and preferably from about 200 to about 300, although the value of n can be outside of these ranges.

The cyclic unsaturated-alkyl-group-substituted polyorganosiloxane typically is of the general formula

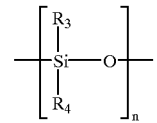

wherein $R_3$ is an alkyl radical, typically having from 1 to about 6 carbon atoms, or an alkene or alkyne radical, typically having from 2 to about 8 carbon atoms, $R_4$ is an alkene or alkyne radical, typically having from 2 to about 8 carbon atoms, and n is an integer of from about 3 to about 6. Specific examples of suitable cyclic polyorganosiloxanes include alkenylcyclosiloxanes, such as $(CH_2=CH(CH_3)SiO)_3$ (1,3,5-triethenyltrimethylcyclotrisioxane), $(CH_2=CH(CH_3)SiO)_4$ (1,3,5,7-tetraethenyltetramethylcyclotetrasiloxane), $(CH_2=CHCH_2(CH_3)SiO)_4$ (1,3,5,7-tetrallyltetramethylcyclotetrasiloxane), $(CH_2=CH(CH_3)SiO)_6$ (1,3,5,7,9,11-hexaethenylhexamethylcyclohexasiloxane), all available from United Chemical Technologies, and the like, as well as mixtures thereof. One particularly preferred cyclic unsaturated-alkyl-group-substituted polyorganosiloxane is 1,3,5,7-tetravinyl tetramethyl cyclotetrasiloxane, believed to be of the formula

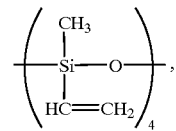

commercially available from, for example, United Chemical Technologies, Piscataway, N.J. as T2160.

Optionally, the stabilizing agent can also contain a nonfunctional polyorganosiloxane oil, such as polydimethylsiloxane; this component is frequently added to the other stabilizing agent ingredients to enhance ease of mixing thereof.

The stabilizing agent can be prepared by any suitable or effective method. For example, the stabilizing agent can be prepared by admixing all of the stabilizer ingredients (i.e., metal-bidentate ligand compound, linear unsaturated-alkyl-group-substituted polyorganosiloxane, and cyclic unsaturated-alkyl-group-substituted polyorganosiloxane), if desired in a base material to facilitate mixing, such as a nonfunctional polydimethylsiloxane oil, agitating the resulting dispersion (in, for example, a ball mill) for from about 1 to about 3 days, subsequently heating the dispersion to a temperature of from about 150 to about 400° F. for from about 1 to about 8 hours, and filtering the dispersion, through, for example, Whatman no. 2 filter paper to obtain the stabilizing agent. The stabilizing agent is then added to the uncrosslinked polyorganosiloxane prior to or during the crosslinking process.

The stabilizing agent is added to the liquid containing the uncrosslinked fluorosilicone polymer and the crosslinking agent in any desired or effective amount, typically from about 0.01 to about 10 parts per hundred by weight of the uncrosslinked fluorosilicone polymer, preferably from about 0.1 to about 5 parts per hundred by weight of the uncrosslinked fluorosilicone polymer, more preferably from about 0.5 to about 2.5 parts per hundred by weight of the uncrosslinked fluorosilicone polymer, and even more preferably from about 1 to about 2 parts per hundred by weight of the uncrosslinked fluorosilicone polymer, although the amount can be outside of these ranges.

Optionally, conductive fillers can be dispersed in the compositions of the present invention. Preferred fillers for electrostatographic fuser member applications are capable of interacting with functional groups of a fusing release agent to form a thermally stable film which releases the thermoplastic resin toner and prevents the toner from contacting the filler surface material itself. This bonding enables a reduction in the amount of oil needed to promote release. Further, preferred fillers for electrostatographic fuser members promote bonding with the oil without causing problems such as scumming or gelling. It is preferred that the fillers be substantially non-reactive with the polymer material so that no adverse reaction occurs between the polymer material and the filler which would hinder curing or otherwise negatively affect the strength properties of the crosslinked composition. Fillers can also increase thermal conductivity.

Other optional adjuvants and fillers can be incorporated in the composition of the present invention, provided that they do not affect the integrity of the polymer material. Such fillers normally encountered in the compounding of elastomers include coloring agents, reinforcing fillers, processing aids, accelerators, and the like. Oxides, such as magnesium oxide, and hydroxides, such as calcium hydroxide, are suitable for use in curing many fluoroelastomers. Proton acids, such as stearic acid, are suitable additives in EPDM and BR polymer formulations to improve release properties of the crosslinked polymer by improving bonding of amino oils to the elastomer composition. Other metal oxides, such as cupric oxide and/or zinc oxide, can also be used to improve release properties of the crosslinked polymer. Metal oxides, such as copper oxide, aluminum oxide, magnesium oxide, tin oxide, titanium oxide, iron oxide, zinc oxide, manganese oxide, molybdenum oxide, and the like, carbon black, graphite, metal fibers and metal powder particles such as silver, nickel, aluminum, and the like, as well as mixtures thereof, can promote thermal conductivity. The addition of silicone particles to a composition of the present invention can increase release properties of the composition. Processability of a fluoropolymer electrostatographic fuser member can be increased by increasing absorption of silicone oils, in particular by adding fillers such as fumed silica or clays such as organo-montmorillonites. Inorganic particulate fillers can increase the abrasion resistance of the composition. Examples of such fillers include metal-containing fillers, such as a metal, metal alloy, metal oxide, metal salt, or other metal compound; the general classes of suitable metals include those metals of Groups 1b, 2a, 2b, 3a, 3b, 4a, 4b, 5a, 5b, 6b, 7b, 8, and the rare earth elements of the Periodic Table. Specific examples of such fillers are oxides of aluminum, copper, tin, zinc, lead, iron, platinum, gold, silver, antimony, bismuth, zinc, iridium, ruthenium, tungsten, manganese, cadmium, mercury, vanadium, chromium, magnesium, nickel, and alloys thereof. Also suitable are reinforcing calcined alumina and non-reinforcing tabular alumina.

If desired, the compositions of the present invention can be coated onto a substrate by any desired or suitable means, including normal spraying, dipping, and tumble spraying techniques. A flow coating apparatus as described in Copending Application U.S. Ser. No. 08/672,493 filed Jun. 26, 1996, entitled "Flow Coating Process for Manufacture of Polymeric Printer Roll and Belt Components," the disclosure of which is totally incorporated herein by reference, can also be used to flow coat a series of substrates. It is preferred that the polymers be diluted with a solvent, and particularly an environmentally friendly solvent, prior to application to the substrate. Alternative methods, however, can be used for coating layers, including methods described in U.S. application Ser. No. 09/069,476, filed Apr. 29, 1998, now U.S. Pat. No. 6,099,673 entitled "Method of Coating Fuser Members," the disclosure of which is totally incorporated herein by reference.

The crosslinked fluorosilicones of the present invention have many possible uses; for example, they can be employed as intermediate or outer layers of electrostatographic fuser members, electrostatographic intermediate transfer belt materials and the like. They are useful in applications wherein materials possessing desirable release characteristics, surface energies, electrical characteristics, oil resistance properties, or solvent resistance properties exhibited by fluorosilicone elastomers are desirable. They are also useful in applications wherein fluorosilicones are exposed to high temperatures, since the stabilizing components reduce the generation of toxic effluents such as trifluoropropionaldehyde and formaldehyde, which can form when methyl-methyl crosslinking of the polymer occurs, and increase temperature stability.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Three 21 milliliter headspace vials, each containing 1 gram of GE Silicones Silanol/STPD Fluorosilicone Fluid, were prepared by placing them in a 400° F. oven for 1 week. Thereafter, the vials were analyzed by heating them in a 400° F. oven for 10 minutes. One vial was used as a control sample with no additives. The second vial contained the fluorosilicone with 2 parts per hundred by weight of a thermal stabilizing agent according to the present invention, said thermal stabilizing agent was prepared by admixing 10 grams of cerium (111) acetylacetonate (obtained from Aldrich Chemical Co., Milwaukee, Wis.), 5 grams of vinyl Q-resin (obtained from United Chemical Technologies, Piscataway, N.J.), 5 grams of tetravinyl tetramethyl cyclotetrasiloxane (Vinyl Q-Resin dispersion, obtained from United Chemical Technologies, Piscataway, N.J.), and 40 grams of nonfunctional polydimethylsiloxane (obtained from Xerox Corp., with a viscosity of 100 centiStokes), followed by ball milling at 400° F. for 2.5 hours and subsequent filtering. The third vial contained the fluorosilicone with 2 parts per hundred by weight of a thermal stabilizing agent similar to that in the second vial (and prepared the same way as that in the second vial) except that the thermal stabilizing agent contained no tetravinyl tetramethyl cyclotetrasiloxane. Subsequent to heating at 400° F. for 10 minutes, 2 milliliter volumes of the headspace gases were removed from each of the three vials with gas tight syringes and analyzed by GC/MS on a Finnigan Incos 50 mass spectrometer system. The oven of the gas chromatograph was programmed from 45 to 245° C. at 6° C. per minute and a 30 meter DB-5 column (0.25 millimeter inner diameter) was used. Based on the peak areas of the 64 m/z ion of trifluoropropionaldehyde, the relative amounts of trifluoropropionaldehyde present in the headspace gases of each vial were as follows:

| Vial | Relative Amount TFPA |
|------|---------------------|
| 1 | 268,172 |
| 2 | 35,600 |
| 3 | 549,559 |

As the data indicate, the vial containing the thermally stabilized fluorosilicone according to the present invention exhibited greatly reduced trifluoropropionaldehyde emissions compared to the control and to the vial containing no tetravinyl tetramethyl cyclotetrasiloxane. Similar results are expected for the solid stabilized crosslinked fluorosilicone materials.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A composition comprising a crosslinked product of a liquid composition which comprises (a) a fluorosilicone, (b) a crosslinking agent, and (c) a thermal stabilizing agent comprising a reaction product of (i) a cyclic unsaturated-alkyl-group-substituted polyorganosiloxane, (ii) a linear unsaturated-alkyl-group-substituted polyorganosiloxane, and (iii) a metal acetylacetonate or metal oxalate compound.

2. A composition according to claim 1 wherein the fluorosilicone is of the formula

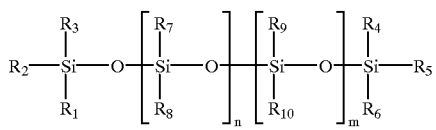

wherein each of $R_1$, $R_2$, $R_3$, $R_4$, $R_5$, $R_6$, $R_7$, $R_8$, $R^9$, and $R_{10}$, independently of the others, is an alkyl group, an aryl group, or an arylalkyl group, provided that at least one of $R_9$ and $R_{10}$ is a fluoro-substituted alkyl, aryl, or arylalkyl group, and m and n are each integers representing the number of repeat monomer units.

3. A composition according to claim 1 wherein the average fluorine content of the fluorosilicone is from about 5 to about 71 percent by weight.

4. A composition according to claim 1 wherein the fluorosilicone has a weight average molecular weight of from about 3,600 to about 80,000.

5. A composition according to claim 1 wherein the fluorosilicone has a weight average molecular weight of from about 6,000 to about 70,000.

6. A composition according to claim 1 wherein the crosslinking agent is a peroxide or an organic diamine curative.

7. A composition according to claim 1 wherein the crosslinking agent is present in the liquid in an amount of from about 1 to about 10 percent by weight of the fluorosilicone polymer.

8. A composition according to claim 1 wherein the thermal stabilizing agent is a reaction product of (i) a cyclic unsaturated-alkyl-group-substituted polyorganosiloxane, (ii) a linear unsaturated-alkyl-group-substituted polyorganosiloxane, and (iii) a metal acetylacetonate compound.

9. A composition according to claim 1 wherein the thermal stabilizing agent is a reaction product of (i) a cyclic unsaturated-alkyl-group-substituted polyorganosiloxane, (ii) a linear unsaturated-alkyl-group-substituted polyorganosiloxane, and (iii) a metal oxalate compound.

10. A composition according to claim 1 wherein the metal of the metal acetylacetonate or metal oxalate compound is $Zr^{2+}$, $Zn^{2+}$, $Fe^{2+}$, $Fe^{3+}$, $Ce^{3+}$, $Cr^{2+}$, $Cr^{3+}$, or mixtures thereof.

11. A composition according to claim 1 wherein the metal acetylacetonate or metal oxalate compound is cerium (III) acetylocetonate hydrate.

12. A composition according to claim 1 wherein the thermal stabilizing agent further comprises nonfunctional polyorganosiloxane oil.

13. A composition according to claim 1 wherein the linear unsaturated-alkyl-group-substituted polyorganosiloxane is of the formula

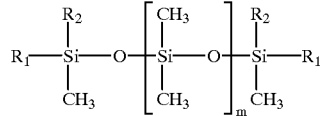

wherein $R_1$ and $R_2$ are selected from the group consisting of hydroxy and alkyl, alkoxy, alkene, and alkyne radicals having from 1 to about 10 carbon atoms, provided that at least one of $R_1$ and $R_2$ is alkene or alkyne, and m is an integer representing the number of repeat monomer units.

14. A composition according to claim 1 wherein the linear unsaturated-alkyl-group-substituted polyorganosiloxane is 1,3-divinyl tetramethyl disiloxane, 1,1,3,3-tetraallyl-1,3-dimethyl disiloxane, 1,3-divinyl-1,3-dimethyl-1,3-dihydroxy disiloxane, vinyl dimethyl terminated polydimethyl siloxane having from 1 to about 50 repeating dimethylsiloxyl units, or mixtures thereof.

15. A composition according to claim 1 wherein the linear unsaturated-alkyl-group-substituted polyorganosiloxane is of the formula

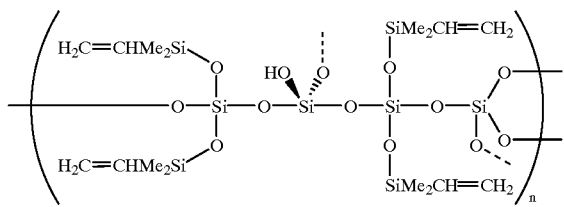

wherein n is an integer representing the number of repeat monomer units.

16. A composition according to claim 1 wherein the cyclic unsaturated-alkyl-group-substituted polyorganosiloxane is of the formula

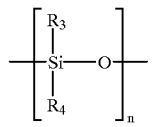

wherein $R_3$ is an alkyl radical, an alkene radical, or an alkyne radical, $R_4$ is an alkene or alkyne radical, and n is an integer of from about 3 to about 6.

17. A composition according to claim 1 wherein the cyclic unsaturated-alkyl-group-substituted polyorganosiloxane is 1,3,5-triethenyltrimethylcyclotrisiloxane, 1,3,5,7-tetraethenyltetramethylcyclotetrasiloxane, 1,3,5,7-tetrallyltetramethylcyclotetrasiloxane, 1,3,5,7,9,11-hexaethenylhexamethylcyclohexasiloxane, or mixtures thereof.

18. A composition according to claim 1 wherein the cyclic unsaturated-alkyl-group-substituted polyorganosiloxane is 1,3,5,7-tetravinyl tetramethyl cyclotetrasiloxane.

19. A composition according to claim 1 wherein the thermal stabilizing agent contains the metal acetylacetonate or metal oxalate compound in an amount of from about 9 to about 59 parts by weight for every 4 to 30 parts by weight of the cyclic unsaturated-alkyl-group-substituted polyorganosiloxane and for every 4 to 30 parts by weight of the linear unsaturated-alkyl-group-substituted polyorganosiloxane.

20. A composition according to claim 1 wherein the thermal stabilizing agent contains the metal acetylacetonate or metal oxalate compound in an amount of from about 25 to about 42 parts by weight for every 10 to 22 parts by weight of the cyclic unsaturated-alkyl-group-substituted polyorganosiloxane and every 10 to 22 parts by weight of the linear unsaturated-alkyl-group-substituted polyorganosiloxane.

* * * * *